(No Model.) 5 Sheets—Sheet 1.

J. P. LEE.
METAL WORKING MACHINE.

No. 510,512. Patented Dec. 12, 1893.

Witnesses

Joseph P. Lee, Inventor

Attorneys (No Model.)

5 Sheets—Sheet 2.

J. P. LEE.
METAL WORKING MACHINE.

No. 510,512. Patented Dec. 12, 1893.

Witnesses
C. C. Burdine

Inventor
Joseph P. Lee
Attorneys

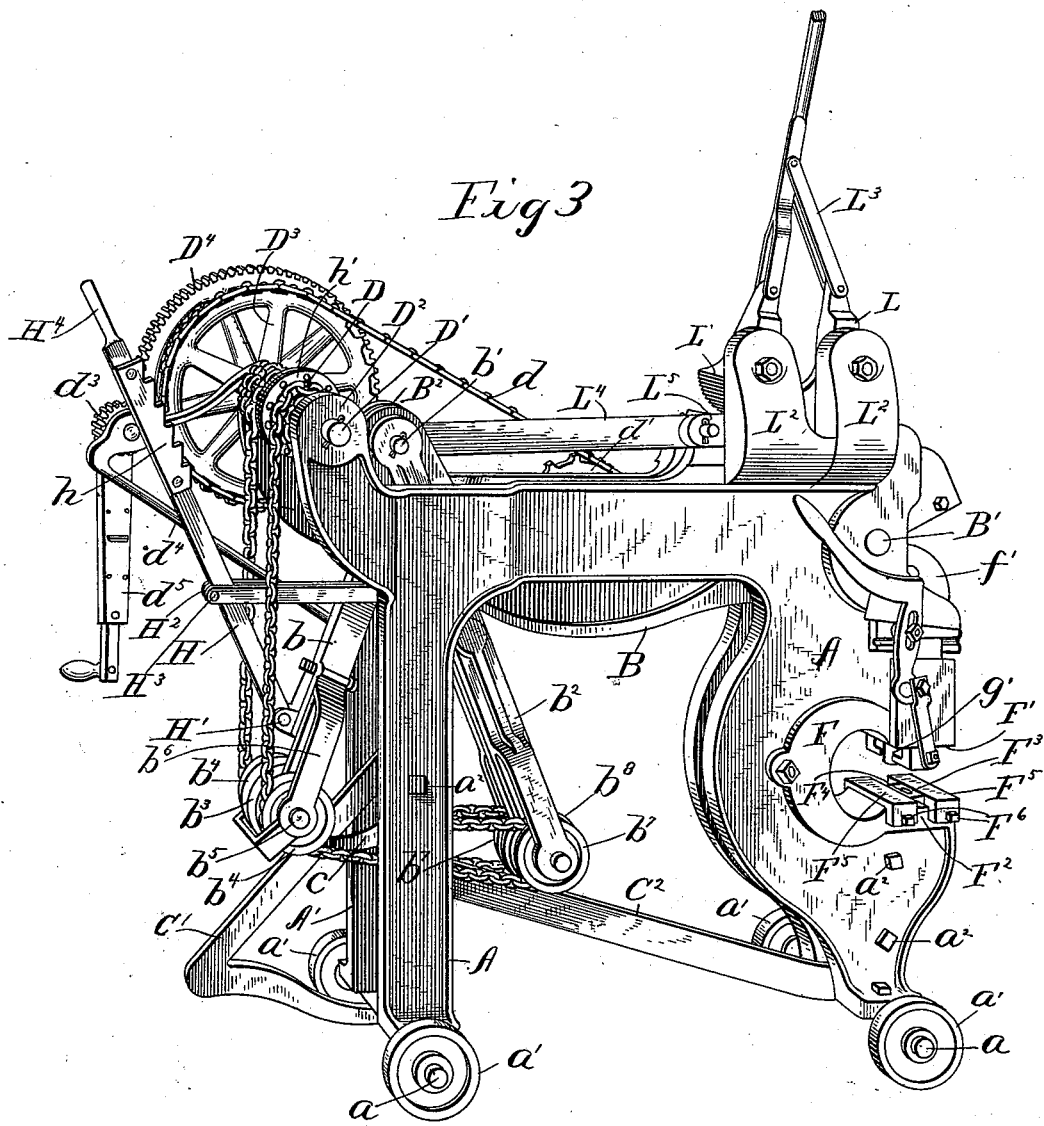

(No Model.) 5 Sheets—Sheet 4.
J. P. LEE.
METAL WORKING MACHINE.
No. 510,512. Patented Dec. 12, 1893.
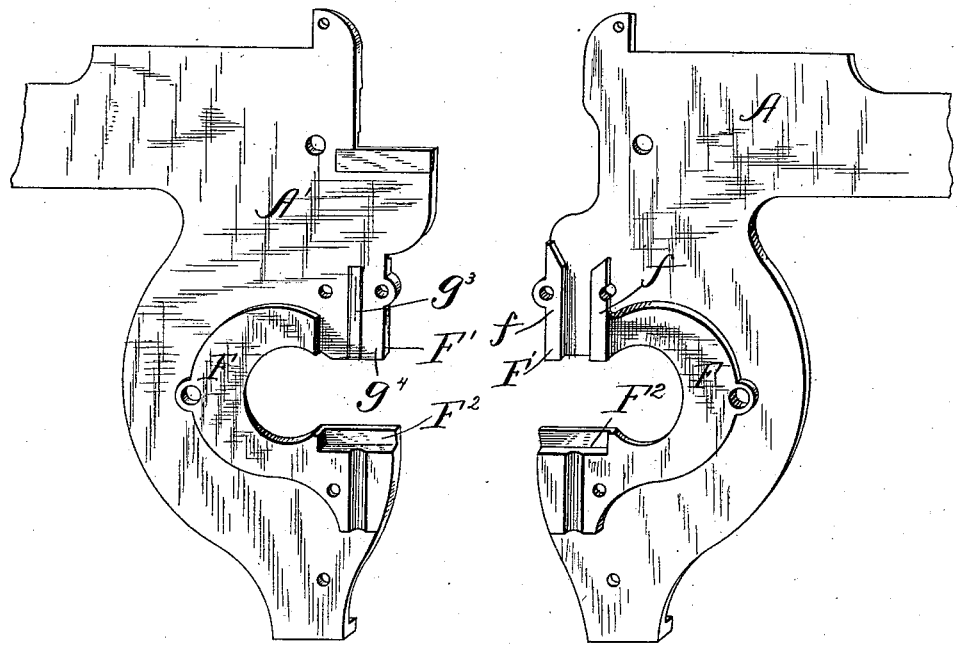
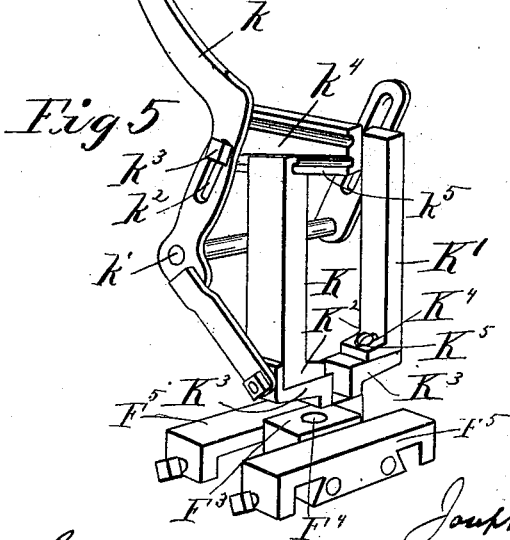
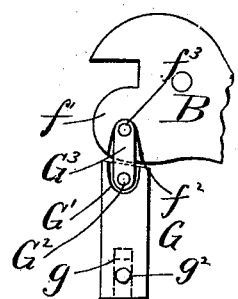
Witnesses
Inventor
Joseph P. Lee
Attorneys (No Model.) 5 Sheets—Sheet 5.
J. P. LEE.
METAL WORKING MACHINE.
No. 510,512. Patented Dec. 12, 1893.
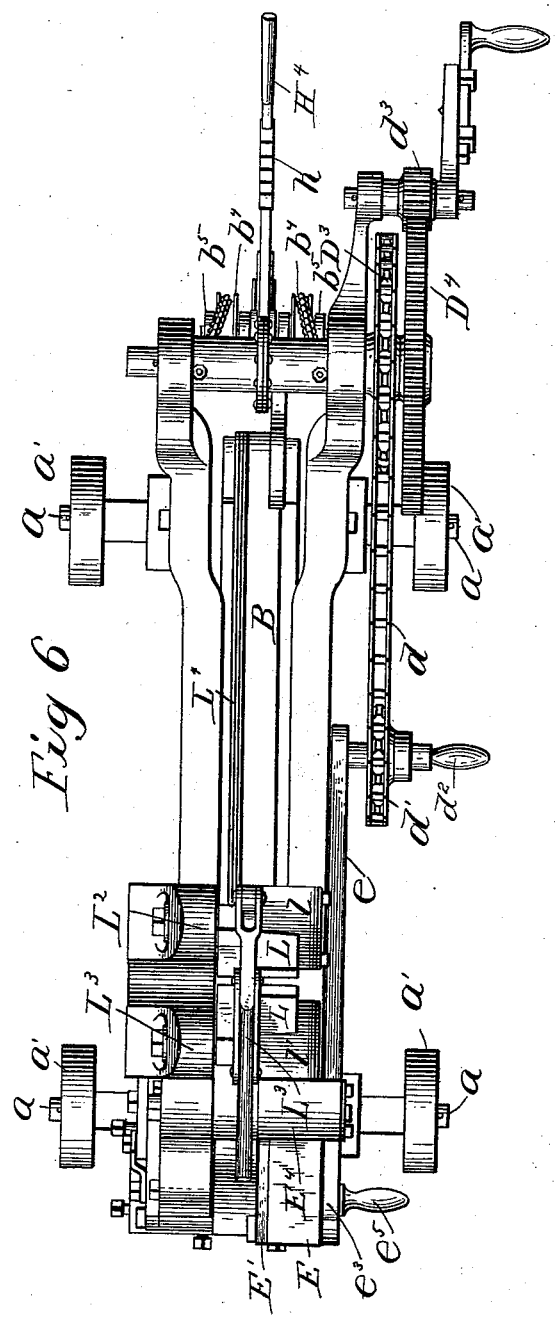
Witnesses
Inventor
Joseph P. Lee
Attorneys

UNITED STATES PATENT OFFICE.

JOSEPH P. LEE, OF WYALUSING, PENNSYLVANIA.

METAL-WORKING MACHINE.

SPECIFICATION forming part of Letters Patent No. 510,512, dated December 12, 1893.

Application filed August 11, 1893. Serial No. 482,882. (No model.)

*To all whom it may concern:*

Be it known that I, JOSEPH P. LEE, a citizen of the United States, residing at Wyalusing, in the county of Bradford and State of Pennsylvania, have invented certain new and useful Improvements in Metal-Working Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a machine for shearing, punching and upsetting metal, and it has for its object the production of a more efficient and easily operated machine, and one wherein the power used may be manual.

A further object is to provide a machine which will not require securing to the floor when operating, and which owing to this attribute, may be readily transported from place to place in the shop where it is used.

To this end my invention consists of certain peculiar features of construction and arrangement of parts whereby the three above named functions (shearing, punching and upsetting metal) are embraced in one compact machine, all of which will now be fully described and finally embodied in the claims.

Figure 1:
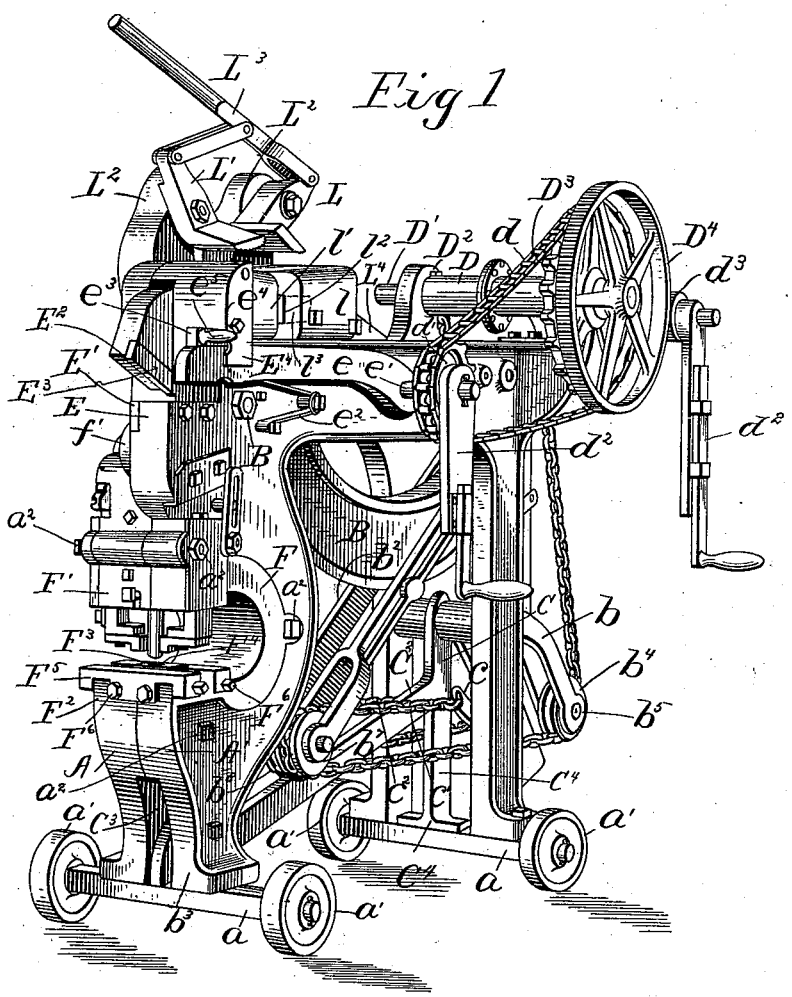
Figure 2:
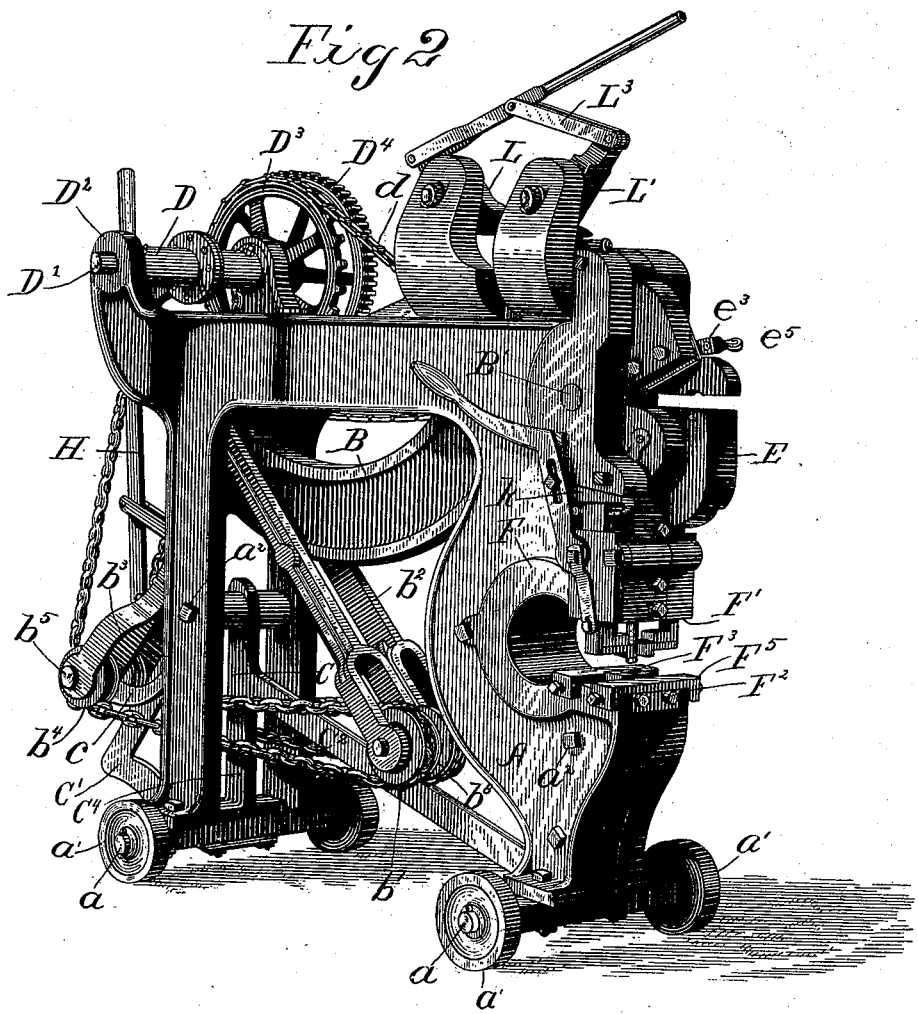

Referring to the accompanying drawings: Figure 1 represents a perspective view of my machine showing the front and right sides; Fig. 2 a perspective showing the front and left sides; Fig. 3 a perspective showing the left and rear sides; Fig. 4 a view showing portions of the frame dissembled; Fig. 5 a detail perspective view showing the mechanism for holding the stock while punched; Fig. 6 a plan view of my machine, and Fig. 7 is a detail view showing the punch connection with the operating lever.

The frame of my machine consists of two longitudinal sections A, A', shaped substantially like an inverted U and secured at the lower ends of its arms to the axles $a$, which are mounted upon the rollers or casters $a'$. By this means the machine is rendered movable. The sections A, A' are securely fastened together by means of the bolts $a^2$, and are constructed on their contiguous sides so that the various parts of the machine may be arranged and operated therein. All of this will appear hereinafter.

The reference letter B indicates the operating lever of my machine which is arranged between the frame sections A, A' and fulcrumed near its forward end to the pin B' extending through both sections of the frame and secured therein by any suitable means. The general shape of the lever B is that of a segment of a circle, and its lower end is bifurcated at $B^2$ to facilitate securing thereto the link $b$. This is done by means of the pin $b'$ which extends through the lever and serves as a fulcrum or pin for the double link $b^2$. The link $b$ is pivotally fixed to the lever and provided at its lower end with three pulleys $b^3$, $b^4$ journaled revolubly therein by means of the pin $b^5$, while the three arms $b^6$ serve as the housing or boxes for the pulleys. The pulleys $b^3$, $b^4$ are three in number, the pulley $b^3$ being larger than the remaining two and arranged between them. The purpose of this will hereinafter appear. The link $b^2$ is formed double, that is: with two sections embracing the main lever and so related to each other that the lever may readily pass between them in operation. The link $b^2$ is longer than its companion $b$, and has its lower or free end provided with pulleys $b^7$, $b^8$ similar in form and number to the pulleys $b^3$, $b^4$.

C represents a track or way provided with two inclined sections C' and $C^2$ sloping from each other and secured to the axles $a$ by bolts. The lower end of the track $C^2$ extends just over the forward end of the front axle $a$ and has its outer end bent upwardly and securely bolted in an orifice $C^3$ formed therefor in the forward portion of the frame, while the portion C' of the track C, extends first out beyond the rear axle and thence back to the axle, where it is firmly secured thereto, a vertical brace $C^4$ being provided and extending from the highest end of the section C' down to the rear axle. From this brace $C^4$ the section $C^2$ of the track starts, and the whole structure is by preference formed integral either by forging or casting.

Secured to the link $b$ adjacent to each of the pulleys $b^4$ are two hooks $c$, projecting rearwardly and having attached to their free ends the chains $c'$ and $c^2$. Each of these chains extends forward and over the pulleys $b^7$ of the the link $b$, thence back around the pulleys $b^4$ and up to the winding drum D. The pulleys $b^3$ and $b^8$ travel on the track sections C' and C² respectively, and when the chains $c'$ and $c^2$ are drawn upwardly by means of the drum D, the said pulleys travel on the tracks and are brought near to each other thus raising their upper ends and hence the rear end of the lever B. The drum D is mounted on the shaft D' which is in turn journaled in the bearings D² extending from the machine frame. Keyed to the right-hand end of the shaft D' is a large sprocket wheel D³ and spur gear D⁴, the former of which is adapted to be driven by the chain $d$ working over it and the small sprocket wheel $d'$ from which small wheel power is derived by means of the crank $d^2$. By this means the drum D is driven. The spur-gear D⁴ is adapted to be used as an alternative driving-gear for the drum D, and its power is derived from the pinion $d^3$ mounted in an outrunning frame $d^4$ and provided with a crank $d^5$. The crank $d^5$ is larger than the crank $d^2$ and is adapted for use when the machine is performing on heavy material where more leverage is required. Thus it will be seen that by operating the drum D, the chains $c'$ and $c^2$ will be contracted and the rear end of lever B raised. This will throw its forward end down, and this forward end is arranged with mechanism for punching and shearing metal. This shearing mechanism will now be described.

Projecting out from the front side of the section A' of the frame is a stout arm or table E formed integral with the frame section, and having a steel knife-edge E' securely fixed in a rabbet-groove formed in its left edge. The extreme forward end of the lever B has its lower side squared at E², and to the right-hand edge is secured a knife-edge E³ similar to the knife-edge E' and in such juxtaposition thereto as to, on the down-stroke of the lever's forward end, move directly past it and make a shear cut. The projection or shear table E is provided with a device for holding the work while being operated upon. This consists of the longitudinally extending bar $e$ pivoted at its rear end to the stud $e'$ and projecting forward as far as the outer end of the shear table, a spring $e^2$ being provided to keep it normally off the table. This normal tendency is overcome and the work clamped on the table E by means of the wedge $e^3$ movable longitudinally in the opening $e^4$ in the frame section A', and provided with a handle $e^5$ by which it is operated. As the wedge is pushed in the opening, the bar $e$ is pushed down and binds against the work on the table, thereby clamping it in place. The bar $e$ is steadied and retained by the vertically extending plate E⁴ secured to a projection on the frame and depending therefrom and overlapping the right side of the bar, thereby keeping it in place. From the above it will be seen that upon lifting the long arm of the lever B, the front end will stroke down and effect the operation of shearing. The lower edge of the bar $e$ may be formed with a semi-circular depression to be used when shearing round bars or shafts.

The punching mechanism is arranged below the shears, and will now be described.

In the front portion of the frame is formed an opening F curved in the arc of a circle and having the two opposing squared portions F', F². The portion F² being the lower one serves for the base of the die blocks. This die block is indicated by the letter F³ and consists of a rectangular metallic block having a vertically extending opening F⁴ therein of a diameter equal to the diameter of the punch, in connection with which it operates. The block F³ rests upon the solid portion of the frame and is held in place by the cleats F⁵ secured to the squared portion F² by means of the set screws F⁶. By this means the die block is firmly but removably held in place, and owing to its removable character may be readily replaced if broken or worn out, or if a different size or style is preferred.

Formed on the frame section A on the side adjacent to the companion section, are two vertically extending ribs $f$ best shown in Fig. 4 of a distance from each other about equal to their width, whereby when the two frame sections are assembled, an elongated recess square in cross section will be formed. Projecting out from the front end of the lever B is a nose $f'$ as shown in Fig. 7 extending nearly as far forward as the moving member of the shears. This extension $f'$ has a triangular recess $f^2$ formed therein on the side that bears against the table E, the highest angle being near the upper edge of the extension and starting from the opening $f^3$, while the remaining angles occur on the same horizontal plane and at the lower edge of the extension.

Arranged to operate in the passage formed by the ribs $f$ is a metallic punch-shank G square in cross-section and of a length slightly greater than the length of the ribs. The upper edge of the shank G on the same side as the side of the lever B which has the recess $f^2$ therein, has a similar recess G' formed in it. This recess is triangular and has two of its angles on the upper extremity of the shank, while its third starts from an opening G² below the plane of the first two. Arranged in the recesses $f^2$ and G' and extending from the hole $f^3$ to the hole G² is a link G³, and on the other side of the lever and extending from each of the said holes is a second link. By means of these two links the shank G is connected to the lever and it is the function of the recesses $f^2$ and G' to allow the stud or extension $f'$ to slide over the laterally movable shank G, and yet have a positive connection therewith by which the shank may be returned, and the power on the down or punching stroke of the shank is applied solely by actual contact with the lever extension $f'$, the links being used only to effect the return. The recesses $f^2$ and $G'$ are formed only on one side of the lever owing to the fact that the lever bears on the side in which they are formed, flush with the table E, there being no room for the link to occur above the plain side of the lever, while on the other side provision can be easily made for the link in the frame section A, and for this reason the counter-sinking of it is unnecessary.

Secured in the annular elongated recess $g$ of the shank G by means of the set screw $g^2$, is the punch proper $g'$ which may be of any preferred pattern, and which is adapted to project below the squared portion $F'$ of the indentation F, the set screw $g^2$ being adapted to operate in the vertically extending slot $g^3$ of the face plate $g^4$. The face plate $g^4$ is securely fastened to the forward portion of the frame just above the indentation F, and opposite that part in which the shank G is arranged. From the above description it will be seen that as the lever B is lifted its forward end will move down, pushing with it the punch-shank G and punch $g'$ far enough to complete the punching operation, and that when the lever moves back the punch and shank will be raised ready for another operation, by means of the link $G^3$ and its companion on the opposite side of the lever B, all of which has been explained.

Means in addition to the die block, are provided whereby the stock being punched is kept from lateral displacement while mounted on the die block. These will now be described.

K and K' see Fig. 5 indicate two vertically movable bars arranged in vertical grooves in the sides of the machine, and having their lower ends bent inwardly at $K^2$, to which bent ends the shoes or grippers $K^3$ are secured by means of the set-bolts $K^4$ working in laterally elongated slots $K^5$. These lower ends $K^2$ are arranged so that their shoes $K^3$ will occur one on each side of the punch, and the shoes are adapted to engage and hold the material to be punched. The mechanism for raising and lowering the bars K, K' consists of the bent lever $k$ fulcrumed to the rock-bar $k'$ and provided with a vertically elongated slot $k^2$ which receives the end of the headed stud $k^3$. The stud $k^3$ is rigidly secured to the wedge $k^4$ which is movable transversely in the slide $k^5$ and bearing at its lower edge against the upper end of the left-hand bar K. By this means, when the lever $k$ is swung forward on its fulcrum, the wedge $k^4$ will move forward and thereby engage the upper end of the bar K, which will result in the downward movement of the bar. The bar K' is adapted to move in unison with the bar K, and this is effected by means of the work or material to be punched, which is firmly clamped between the two. Thus the bars are positively connected, and when the bar K moves its movement will be followed by a corresponding movement of its companion.

The upsetting mechanism will now be described. This consists of the twin clamps L, L' fulcrumed to the projections $L^2$ and provided with the lever and link device $L^3$ by which they are operated. Arranged directly below these clamps are two blocks $l, l'$, the former $l$ being provided with tongue $l^2$ which is received by a corresponding recess in the block $l$, whereby the other block is allowed to move toward and from its companion. This movement is effected by means of the link or bar $L^4$ pivotally connected to the rear end of the lever B and to a pair of opposing lugs $L^5$ on the block $l$. Thus when the rear or long arm of the lever B is raised, the bar $L^4$ is pushed forward, which will in turn carry with it the block $l$. The block $l'$ is stationary and provided with a tongue $l^2$ which is arranged to operate in the recess $l^3$ in the block $l$. By this means the blocks are kept in their relative positions. To use this part of my machine for upsetting or contracting metal, the metal is first made red hot and then placed upon the blocks $l, l'$, and the clamps L, L' made fast upon it, care being taken to see that the lever B is lowered or in its normal position. When this has been done the machine is operated to raise the lever B which will push the bar $L^4$ forward and move the block $l$ toward its companion. Now as the metal to be upset or contracted is firmly clamped upon the two blocks, the forward movement of one will tend to push the metal together thereby contracting it. This arrangement is particularly adapted for use in resetting or decreasing the size of wagon wheel tires.

To use my invention for shearing, punching or upsetting metal, the work is arranged in the requisite position on the machine and the drum D operated to draw up the rear and long arm of the lever through the medium of the connecting chains, and this operates the machine to perform the desired work, all of which has been fully described. After the machine has performed the desired work, the drum D is released and, owing to the weight of its long arm, the lever B will automatically return to its normal position carrying with it all the other parts of the machine. If, however, the long arm of the lever should fail to drop after the drum has been released, means are provided for effecting such downward movement. These are shown in Fig. 3 and will now be described.

The reference letter H represents a swinging lever fulcrumed to the link $b$ at H'. This lever is provided with a sling $H^2$ consisting of two parallel bars rigidly fixed to the link $b$ near its upper end, and having their outer or free ends connected by means of a rivet $H^3$, the lever H being arranged to operate between the two bars, and its outward movement is consequently limited by the rivet, while the drum D is engaged by it at the limit of its in-stroke. Rigidly secured to the lever H at a point near its end, are the plates $h$ which are two in number and secured one to each side of the lever in the same transverse relation to each other, thereby forming a ratchet-bar the teeth of which are disposed upwardly. This ratchet is arranged to co-operate with the annular concentric disk $h'$ of the drum D, through the medium of the studs $h^2$ formed on or secured to each side of the disk and arranged to mesh with the ratchet-bars $h$. When the long arm of the lever B fails to descend, the lever H is by means of the handle portion $H^4$, thrown from the position it assumes in Fig. 3, forward, so that the periphery of the disk $h'$ will pass between the plates or bars $h$ and the studs $h^2$ come into engagement with the ratchet-teeth. The drum D is then reversed or rotated to the left which will cause the lever H to descend owing to the connection with the drum by way of the disk $h'$ and ratchet $h$. This will push the link $b$ down also and cause the parts of the machine to assume their normal position. This arrangement will not be necessary except in case where the machine is used to punch comparatively heavy metal, and after the lever B has been returned by it, the lever H is swung back to its normal position as shown in Fig. 3, where it remains until used again.

It will be apparent from the above description that the machine can be operated to its full capacity without necessitating securing it to the floor. This is due to the fact that the power applied for operating is a rotary movement as distinguished from the reciprocating movement usually given machines of this class, and that this capacity admits of mounting the machine upon the casters $a'$ whereby it may be easily transported.

Having thus described my invention, what I claim as new, and desire to secure by Letters Patent, is—

1. In a metal working machine, the combination of a lever fulcrumed to the machine, a hoisting device in connection with one of its arms, and a metal working tool connected to and operated by the remaining arm, substantially as described.

2. In a metal working machine, the combination of a lever fulcrumed to the machine, a hoisting device in connection with one of its arms, a shearing blade secured to the remaining arm, a second shearing blade rigid on the machine and arranged to co-operate with the blade on the lever, substantially as described.

3. In a metal working machine, the combination of a lever fulcrumed to the machine, a hoisting device connected to one of its arms by which the lever is operated, and a punch connected to and operated by the remaining end of the lever, substantially as described.

4. In a metal working machine, the combination of a lever fulcrumed to the machine, a hoisting device connected to one end of the lever by which it is operated, a shearing blade on the other end of the lever and arranged to co-operate with a stationary blade on the machine, and a punch connected to and operated by the last named arm of the lever, substantially as described.

5. In a metal working machine, the combination of a lever fulcrumed to the machine and connected at one end with metal working tools, a pair of swinging links connected to its remaining end, inclined ways or tracks for the lower ends of the links, and chains attached to the links whereby when the chains are pulled taut the links will be made to travel up the inclined ways and raise the end of the lever to which they are attached, substantially as described.

6. In a metal working machine, the combination of a lever fulcrumed to the machine, a metal working tool connected to and operated by one of its arms, a pair of swinging links connected to the remaining end, inclined tracks or ways upon which the links are arranged to travel, chains connected to the links, a hoisting device for operating the chains whereby the links are made to move up the inclined tracks and raise the end of the lever to which they are connected, and a rod attached to one of the links and arranged to swing in and out of engagement with the hoisting device and when in engagement therewith to return the links and hence the lever to their normal positions, substantially as described.

In testimony whereof I affix my signature in presence of two witnesses.

JOSEPH P. LEE.

Witnesses:
E. A. STRONG,
LINCOLN WELLES.